Dec. 21, 1948.        J. K. HODNETTE         2,456,941
TRANSFORMER STRUCTURE
Filed Jan. 29, 1944
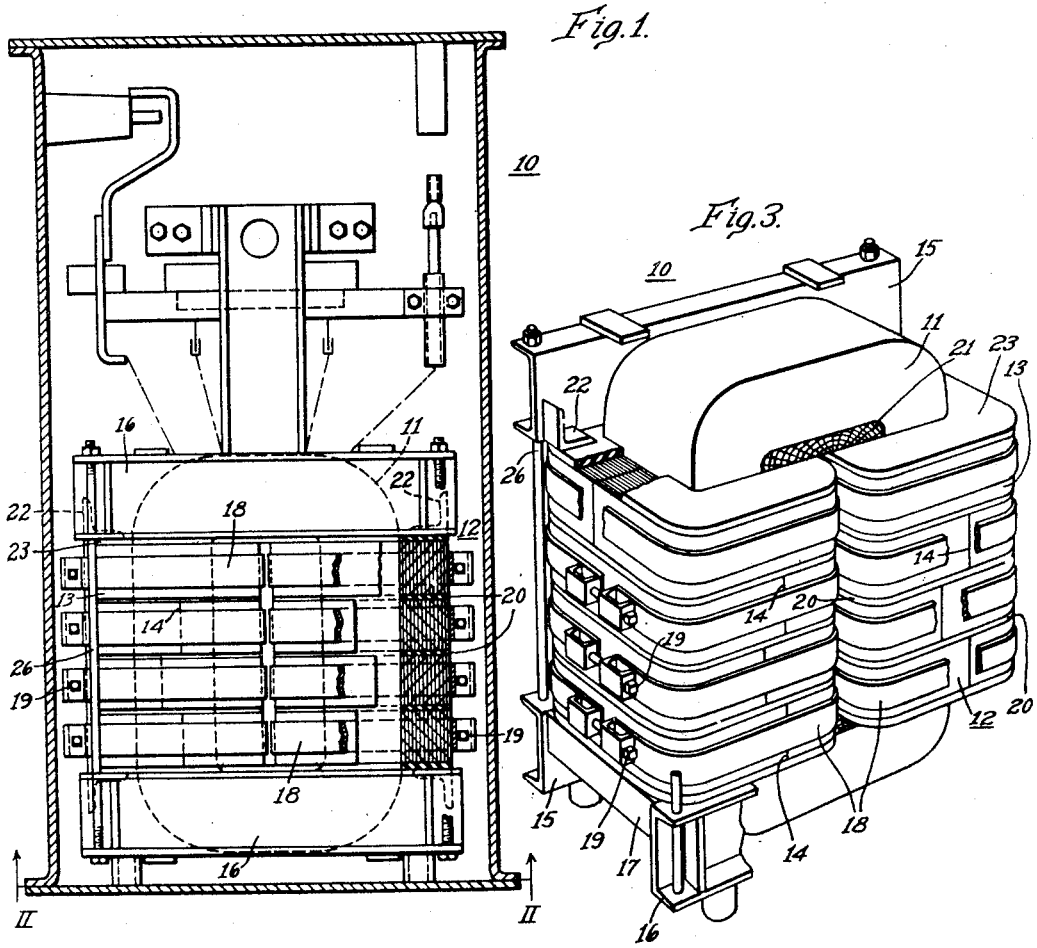
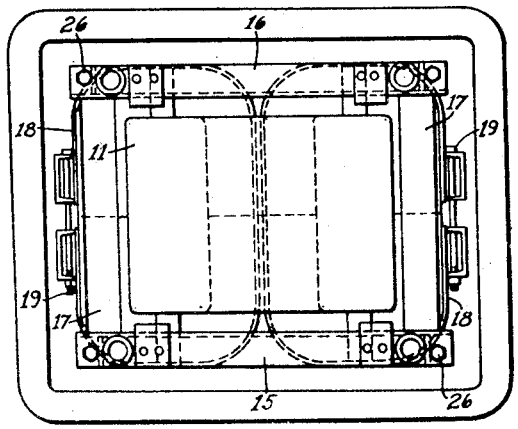
INVENTOR
John K. Hodnette.
by Ezra D. Savage
ATTORNEY Patented Dec. 21, 1948

2,456,941

UNITED STATES PATENT OFFICE 2,456,941

TRANSFORMER STRUCTURE

John K. Hodnette, Sharon, Pa., assignor to Westinghouse Electric Corporation, East Pittsburgh, Pa., a corporation of Pennsylvania Application January 29, 1944, Serial No. 520,221

1 Claim. (Cl. 175—356)

The invention relates, generally, to transformer structures and, more particularly, to the core and coil structure of a transformer.

The object of the invention is to provide a transformer structure in which the weight of the coils is carried by the core disposed to bridge spaced supports in the manner of a beam.

It is also an object of the invention to take advantage of the structure of a wound core, and dispose the laminations on edge to utilize them as beams for carrying a load thereby to simplify the frame structure and to provide a more compact core and to cut down the mean-turn length of the coils.

The invention, accordingly, is disclosed in the embodiment thereof shown in the accompanying drawing, and comprises the features of construction, combination of elements, and arrangement of parts which will be exemplified in the construction hereinafter set forth, and the scope of the application of which will be indicated in the claim.

For a fuller understanding of the nature and objects of the invention, reference should be had to the following detailed description, taken in connection with the accompanying drawing, in which:

Figure 1 is a view, in side elevation, of a transformer constructed in accordance with this invention, having parts broken away to show details of the structure;

Fig. 2 is a transverse section, taken along the line II—II of Fig. 1, showing features of the core structure;

Fig. 3 is a perspective view of a transformer core and coil assembly constructed in accordance with this invention, showing how the core and coils are assembled; and Fig. 4 is a view, partly in section and partly in side elevation, showing a core built from L-plates and the tongue wedge that is employed for supporting them.

Referring now to the drawing, and to Fig. 1 in particular, the transformer shown generally at 10 includes a preformed coil 11 and a core indicated generally at 12. The members illustrated above the coil 11 and core 12 are the bushings and terminals employed for connecting the transformer to a transmission system. Since these elements of a transformer are well known, and form no part of the invention, they will not be described in detail.

Heretofore, in building shell-type transformers, it was usual practice to build a core from L-plates in the case of small transformers, and I-plates for large power transformers. Different methods were employed, for example, in building small transformers a portion of the core could be assembled and the coils then wound around it. After the coils had been completed, the assembly of the core was finished by interfitting the L-plates or the I-plates, as the case might be, with the laminations contained in the section of the core carrying the coils. In building a large power transformer, the core could be assembled around preformed coils.

The supporting of a transformer built from L-plates or I-plates requires a heavy frame. A structural iron end-frame is usually employed for supporting the laminations on all sides. In addition, a support such as shown in Fig. 4 is usually provided inside the coils, in order to provide adequate mechanical strength to carry the weight of the iron laminations. This support, in addition to carrying the weight of the laminations inside the coils, must also press the insulation and laminations into tight engagement with one another, to prevent vibration and noise.

In structures of this kind, it is usual practice to provide tongue wedges. These wedges not only have to be used in the bottom to carry the weight of the iron inside the coils, but they must be provided at the top of the laminations to tighten the insulation and iron inside the coil, to prevent vibration. It will be readily appreciated that transformer cores are made from material which is very heavy for its bulk, therefore the wedge members are usually made from steel T-beams, in order to get adequate strength. In order to accommodate the web of the T-beam and to provide adequate insulation, it is necessary to provide a clearance between the iron of different sections of the core of the order of 1½ to 2½ inches. Such a clearance increases the length of the mean-turn of the coils, and thereby increases the weight of copper employed in building a transformer.

It is further pointed out that the heavy T-beams are subjected to magnetizing forces which cause magnetic flux to flow through them with resulting energy loss. Since the wedge members or T-beams are so located that the leakage flux at the top and bottom of the coils enters them, there are appreciable eddy currents set up which results in objectionable eddy current losses.

In the present structure, one of the main advantages is the elimination of the wedge members or T-beams. In large power transformers, this will greatly reduce the losses caused by the flux induced in these members and the energy lost as the result of eddy currents.

In the present structure, the core comprises a plurality of sections, as best shown in Figs. 1 and 3. Each section 13 comprises a wound core unit which may have any predetermined number of turns of a suitable strip magnetic material. In order to assemble the sections 13 or wound core units, they may be cut, as illustrated, at 14. The place of cutting the core section 13 will depend upon how it is to be assembled. As illustrated in Fig. 3, the majority of the sections 13 are cut at the end, while those placed in the uppermost positions are cut at the sides.

In building a shell-type transformer, in accordance with the teachings of this invention, a plurality of channel members 15 and 16 are arranged in spaced relation and connected to one another by plates 17. The spacing of the channel members 15 and 16 will depend on the length of the core sections 13. The preformed coil 11 is then disposed in position between the channel members 15 and 16. Of course, the coil 11 can be blocked up and located in any desired position relative to the channel members. The core sections 13 are then arranged with their ends facing upwardly and are projected through the window. After one end has been shoved through the coil, it is rotated through 90° to the position illustrated where it bridges the channel members 15 and 16 in the manner of a beam. The complementary part of the core section 13 which simulates a "U" is then placed in position completing the core section. A band 18 is then applied to the parts of the core section and drawn tightly together by means of the bolt 19. Since the turns or laminations of the wound core are on edge, a strong beam-member is provided, capable of carrying a lot of weight.

It will be readily appreciated that as many core sections 13 as desired may be assembled on the legs of the coil 11. In the embodiment illustrated, four core sections 13 are disposed on each leg of the coil 11. It will be noted that the upper core section 13 is cut at the sides, so that one arm of each of the U-members may be inserted into the window in the coil 11 and made to match with its complementary member without rotating it. In designing the transformer, the width of the strip from which the core sections are made can be readily determined so as to completely fill the window.

In this particular construction, spacers 20 are disposed between the core sections 13 to provide insulation for edges of the turns or laminations of the strip and cooling ducts. These spacers may be made from any suitable material such as Fullerboard. In addition to the spacing members 20, wooden spacers 21 are provided at each end between the core sections and the coil 11. In this manner, the assembly may be tightened so as to prevent any possible vibration. Channel members corresponding to 15 and 16 are then disposed on top of the core sections and clamped to one another by means of the rods at 26. In this manner the core sections 13 and spacers 20 are all clamped tightly together to prevent any possible vibration. As shown, members 22 may be provided, on top plates 23 as buffer plates to protect the edges of the laminations. The parts of the core sections 13 located in the window of the coil 11 need not be spaced from one another. By locating the core sections 13 close together, the mean-length of the turns of the coils are reduced by twice the space that was provided between the stacks 25 in old structures, as best shown in Fig. 4. Since there is no wedge member, there is no loss from eddy currents or flux induced in the web of the wedge member 24.

Since the turns of the core sections are bonded to one another, and are on edge with relation to the channel members 15 and 16, they will carry a very heavy load. They function as beams bridging the space between the channel members 15 and 16. They carry the weight of the core and also the weight of the coils. It will be readily appreciated that, by stacking up a predetermined number of core sections of predetermined size, any desired amount of iron can be introduced into a transformer. Transformers of 500 kva. have been built in this manner, and have proved very successful. Transformers of a capacity corresponding to the old type of structure employing L-plates or I-plates can be built which weigh only about two-thirds as much.

Since numerous changes may be made in the above described structure and different embodiments of the invention may be made without departing from the spirit and scope thereof, it is intended that all matter contained in the above description or shown in the accompanying drawings shall be interpreted as illustrative, and not in a limiting sense.

I claim as my invention:

In a transformer structure, in combination, a plurality of supports capable of carrying the weight of the transformer disposed in spaced relation to provide a base, a wound core having a plurality of turns of electrical strip steel bonded to one another, the wound core being cut into a plurality of core sections, a preformed coil, a plurality of core sections fitted through the preformed coil and disposed between the supports, the turns of the core sections being on edge thus giving them strength when employed as beams, a plurality of other core sections fitted around the coil and meeting within the coil thus not bridging the supports, the core sections fitted around the coil cooperating to completely fill the window of the coil, the sections fitted through the preformed coil being disposed in close proximity to one another without an in-between support thereby to reduce losses from stray currents and to reduce the mean turn length of the turns of the preformed coils, the weight of the core and coils being carried by the on-edge sections bridging the space between the supports, and means for retaining the core sections and coils in position on the base.

JOHN K. HODNETTE.

REFERENCES CITED

The following references are of record in the file of this patent:

UNITED STATES PATENTS

| Number | Name | Date |
|---|---|---|
| 1,301,735 | Pearson | Apr. 22, 1919 |
| 1,565,531 | Thompson | Dec. 15, 1925 |
| 1,586,889 | Elmen | June 1, 1926 |
| 2,180,759 | Kneisley | Nov. 21, 1939 |
| 2,289,175 | Boucher | July 7, 1942 |
| 2,318,095 | Putman | May 4, 1943 |
| 2,360,511 | Nelson | Oct. 17, 1944 |

FOREIGN PATENTS

| Number | Country | Date |
|---|---|---|
| 3,913 | Great Britain | 1890 |
| 7,624 | Great Britain | 1890 |
| 7,856 | Great Britain | 1889 |
| 374,828 | Great Britain | Dec. 11, 1930 |